United States Patent [19]
Satoh et al.

[11] Patent Number: 5,933,214
[45] Date of Patent: Aug. 3, 1999

[54] SCANNING EXPOSURE APPARATUS

[75] Inventors: Yasuaki Satoh; Nobu Nakane; Akira Kida, all of Hino; Taku Saito, Hachioji; Katsutoshi Iwai, Hino, all of Japan

[73] Assignee: Konica Corporation, Japan

[21] Appl. No.: 08/977,881

[22] Filed: Nov. 25, 1997

[30] Foreign Application Priority Data

| Dec. 6, 1996 | [JP] | Japan | 8-326915 |
| Dec. 6, 1996 | [JP] | Japan | 8-326916 |
| Dec. 6, 1996 | [JP] | Japan | 8-326917 |
| Jan. 31, 1997 | [JP] | Japan | 9-018368 |
| Feb. 4, 1997 | [JP] | Japan | 9-021394 |

[51] Int. Cl.$^6$ ............................. G03B 27/48; G03B 27/52
[52] U.S. Cl. ............................................. 355/50; 355/40
[58] Field of Search ..................... 355/27, 28, 50, 355/40, 46, 41, 69; 399/206, 211

[56] References Cited

U.S. PATENT DOCUMENTS

| 4,774,547 | 9/1988 | Uchida et al. | 355/27 |
| 5,087,938 | 2/1992 | Nagumo et al. | 355/27 |
| 5,502,542 | 3/1996 | Takano | 355/69 |
| 5,559,585 | 9/1996 | Takagi | 355/228 |
| 5,669,048 | 9/1997 | Nishio et al. | 399/206 |

*Primary Examiner*—Safet Metjahic
*Assistant Examiner*—Hung Henry Nguyen
*Attorney, Agent, or Firm*—Jordan B. Bierman; Bierman, Muserlian and Lucas

[57] ABSTRACT

An exposure apparatus in which a photographic light-sensitive material is exposed to a light image of an original, includes: a light illuminating member for illuminating a light to the original; an optical member for projecting a light transmitted through or reflected on the illuminated original onto an exposure position as a line image of the original; a material conveyor for conveying the material at a constant speed while the line image of the original is projected onto the material; a moving member for moving the original at a definite speed while the line image of the original is projected onto the material; and a start position determining member for determining a start position of the original at which the moving member starts moving according to magnification of the projected image of the original or image density of the original. The moving member starts moving the original from the start position, thereby the definite speed of the original while the slit image of the original is projected onto the material, is varied.

31 Claims, 9 Drawing Sheets

FIG. 10 (a)   FIG. 10 (b)   FIG. 10 (c)
FIG. 10 (d)   FIG. 10 (e)
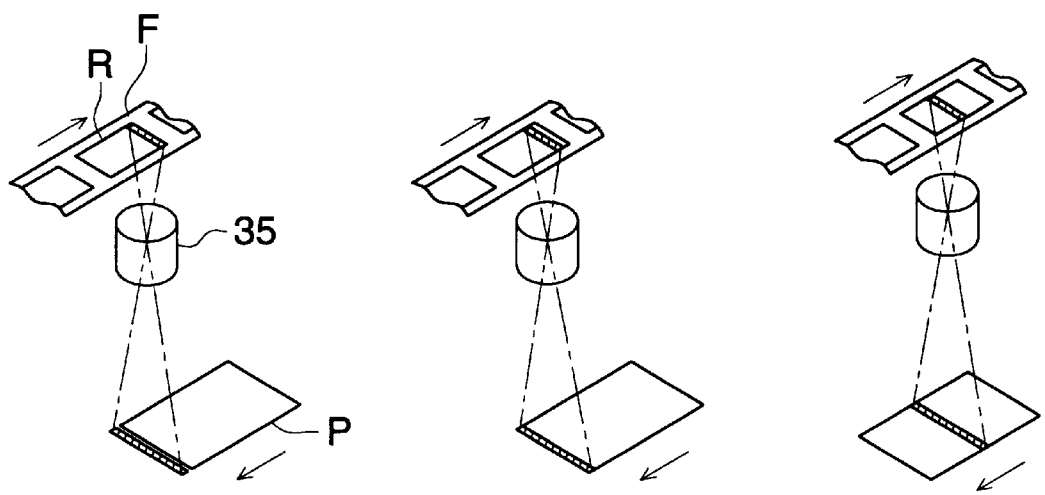
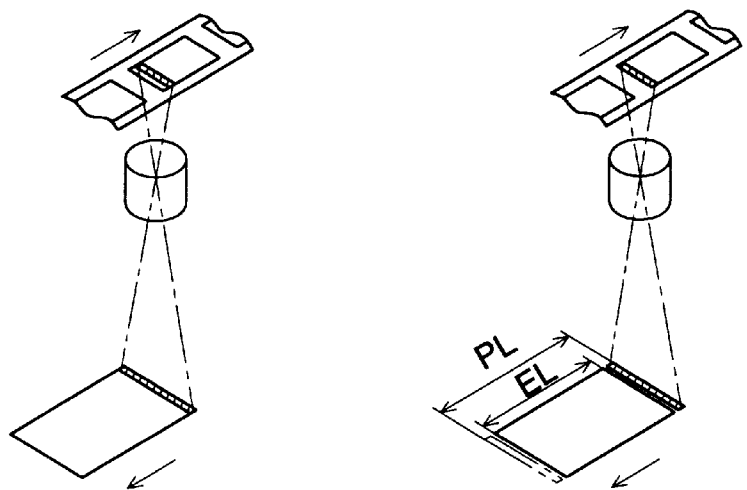

SCANNING EXPOSURE APPARATUS

BACKGROUND OF THE INVENTION

The present invention relates to a scanning exposure apparatus wherein a scanning/moving means scans an original by moving it, and a slit image transmitted through or reflected on the original and then projected and a light-sensitive material are caused to move relatively so that the light-sensitive material may be exposed to an image of the original through scanning exposure.

As an image forming apparatus wherein a light-sensitive material (for example, a photographic paper such as a color paper) is exposed to an original (for example, a photographic film such as a color negative film, a color reversal film or a monochromatic film, hereinafter referred to as a photographic film), there has been an image forming apparatus of a stationary exposure type wherein an entire frame of a photographic film is illuminated by a light source and a light-sensitive material is exposed to light of the entire frame transmitted through the photographic film. In the case of the image forming apparatus of a stationary exposure type, an image of a photographic film is focused on a light-sensitive material, and thereby, an optical system has to be arranged in a straight line, resulting in a large-sized apparatus.

With the foregoing for a background, there has been developed a scanning exposure apparatus as that disclosed in Japanese TOKKAIHEI 3-216636 to make an apparatus small in size. In such a scanning exposure apparatus, an original (photographic film) and a light-sensitive material are synchronized to be conveyed.

In the case of synchronized conveyance, at least one of an original and a light-sensitive material is suspended, and then is started to move synchronizing with a movement of the other, and in the course of synchronized conveyance for both, the state of constant speed is maintained. However, a moving speed in the state of constant speed needs to be changed variously, because the light-sensitive material is exposed to the original at various magnifications. It is therefore necessary to contrive in many ways for conveying both the original and the light-sensitive material synchronously.

SUMMARY OF THE INVENTION

An object of the invention is to manage various magnifications when a light-sensitive material is exposed to an image of an original and to shorten a cycle time for exposure of plural images of the original.

The objects mentioned above can be attained by either of the following structures.

(1) An exposure apparatus in which a photographic light-sensitive material is exposed to a light image of an original, comprising: a light illuminating means for illuminating a light to the original; an optical means for projecting a light transmitted through or reflected on the illuminated original onto an exposure position as a line image of the original; a conveying means for conveying the material at a constant speed while the line image of the original is projected onto the material; a moving means for moving the original at a definite speed while the line image of the original is projected onto the material; and a start position determining means for determining a start position of the original at which the moving means starts moving the original according to magnification of the projected image of the original or image density of the original, wherein the moving means starts moving the original from the start position determined by the start position determining means, thereby the definite speed of the original while the line image of the original is projected onto the material, is varied.

(2) An exposure apparatus comprising: a light illuminating means for illuminating a light to the original; an optical means for projecting a light transmitted through or reflected on the illuminated original onto an exposure position as a line image of the original; a conveying means for conveying the material at a constant speed while the line image of the original is projected onto the material; a moving means for moving the original at a definite speed while the line image of the original is projected onto the material; a material detecting means provided upstream of the exposure position in a conveying direction of the material for detecting the material; and a start time determining means for determining a period of time representing a moving start time between a time when the material is detected by the material detecting means and a time when the original starts moving, according to the magnification of the projected image of the original or the image density of the original, wherein the moving means starts moving the original from the start position after the moving start time determined by the start time determining means elapses and the material detecting means detects the material.

(3) An exposure apparatus in which a photographic light-sensitive material is exposed to a light image of an original, comprising: a light illuminating means for illuminating a light to the original; an optical means for projecting a light transmitted through or reflected on the illuminated original onto an exposure position as a line image of the original; a conveying means for conveying the material at a constant speed while the line image of the original is projected onto the material; a moving means for moving the original at a definite speed while the line image of the original is projected onto the material; a material detecting means provided upstream of the exposure position in a conveying direction of the material for detecting the material, wherein a position of the material detecting means can be varied in the conveying direction of the material; a position determining means for determining the position of the material detecting means, according to the magnification of the projected image of the original or the image density of the original; and a material detecting means moving means for moving the material detecting means to a position determined by the position determining means, wherein the moving means starts moving the original in concurrence with a time when the material detecting means detects the material, or after the material detecting means detects the material.

The line image mentioned above means an image which is at least a part of an image of the original, having a length of its side in the conveyance direction for the original that is shorter than that of its side in the direction perpendicular to the conveyance direction.

The constant speed during which a line image of the original is being projected on the light-sensitive material is changed depending on the position to start moving which is determined by a determining means and from which the original starts moving.

Each of FIGS. 3(a)–3(f) is a diagram showing illustratively the operations of a film holding means and an exposure section conveying means.

Figure 4:
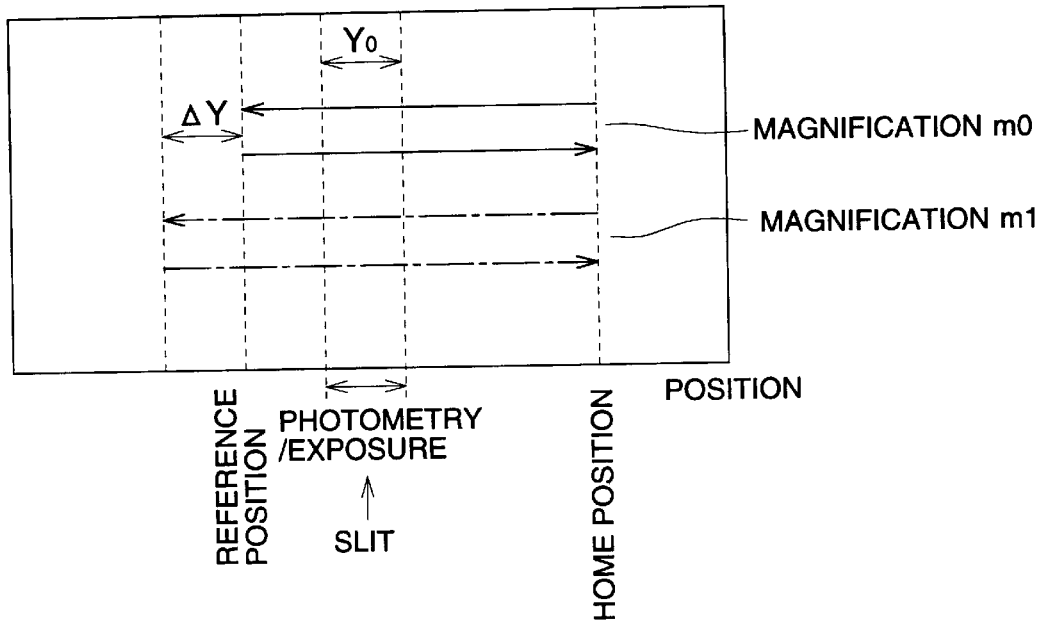

FIG. 4 is a diagram showing illustratively a movement of reciprocation of a carriage.

Figure 5:
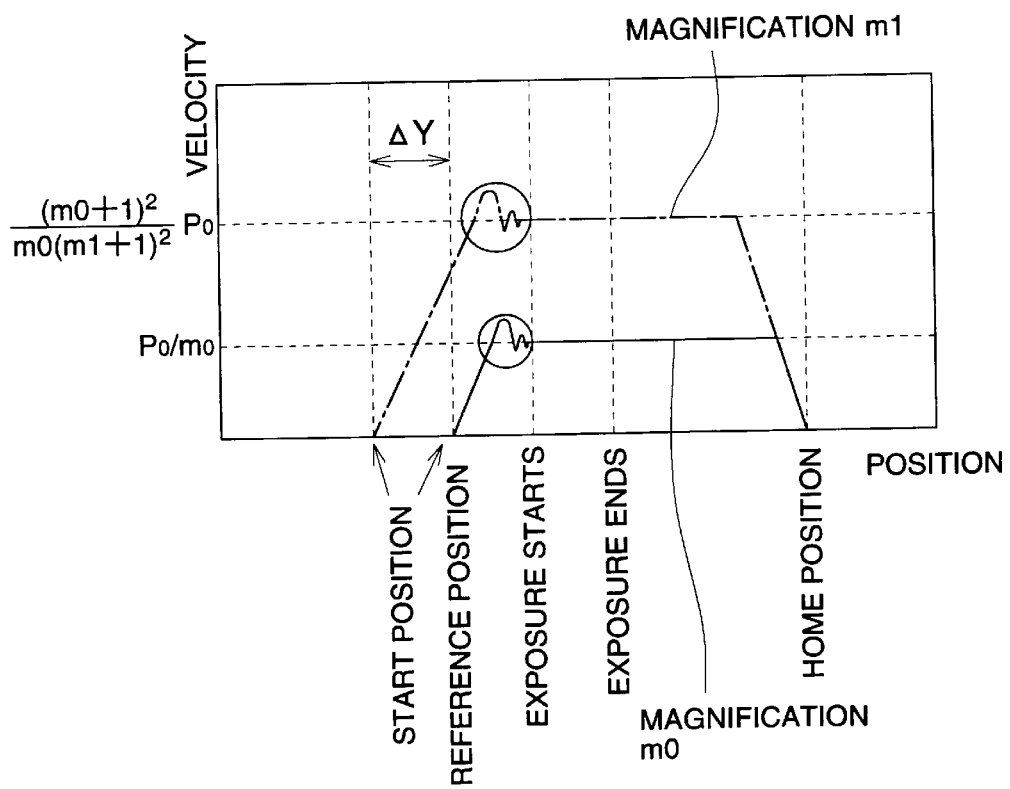

FIG. 5 is a diagram showing illustratively speed changes of a carriage in a movement in the scanning direction.

Each of FIGS. 6(a)–6(f) is a diagram showing illustratively the operations of a feeder and a carriage base body under a pre-judge mode.

Each of FIGS. 7(a)–7(c) is a diagram showing illustratively the operations of a feeder and a carriage base body under a double-scanning mode.

Figure 8:
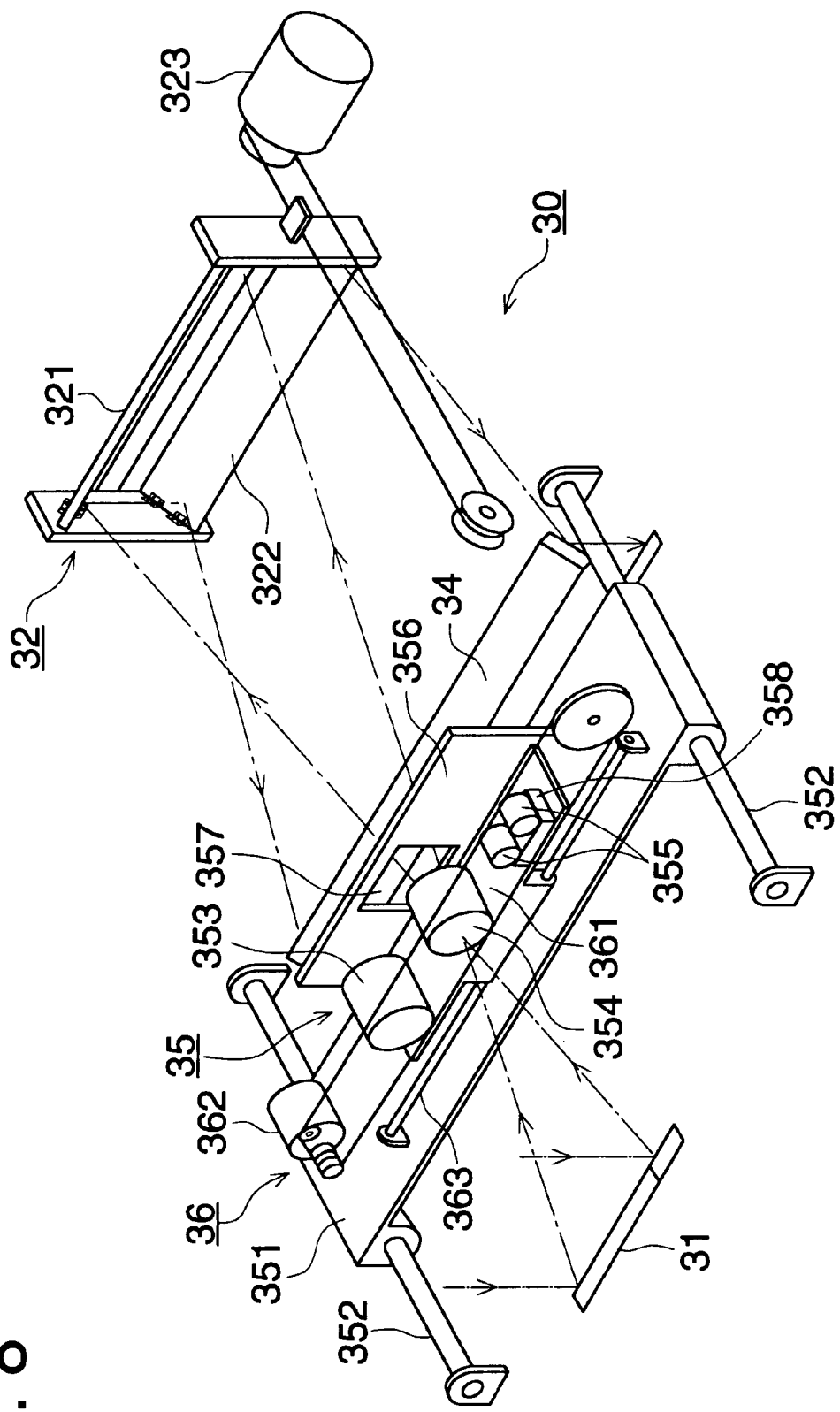

FIG. 8 is a perspective view of an optical means.

Figure 9:
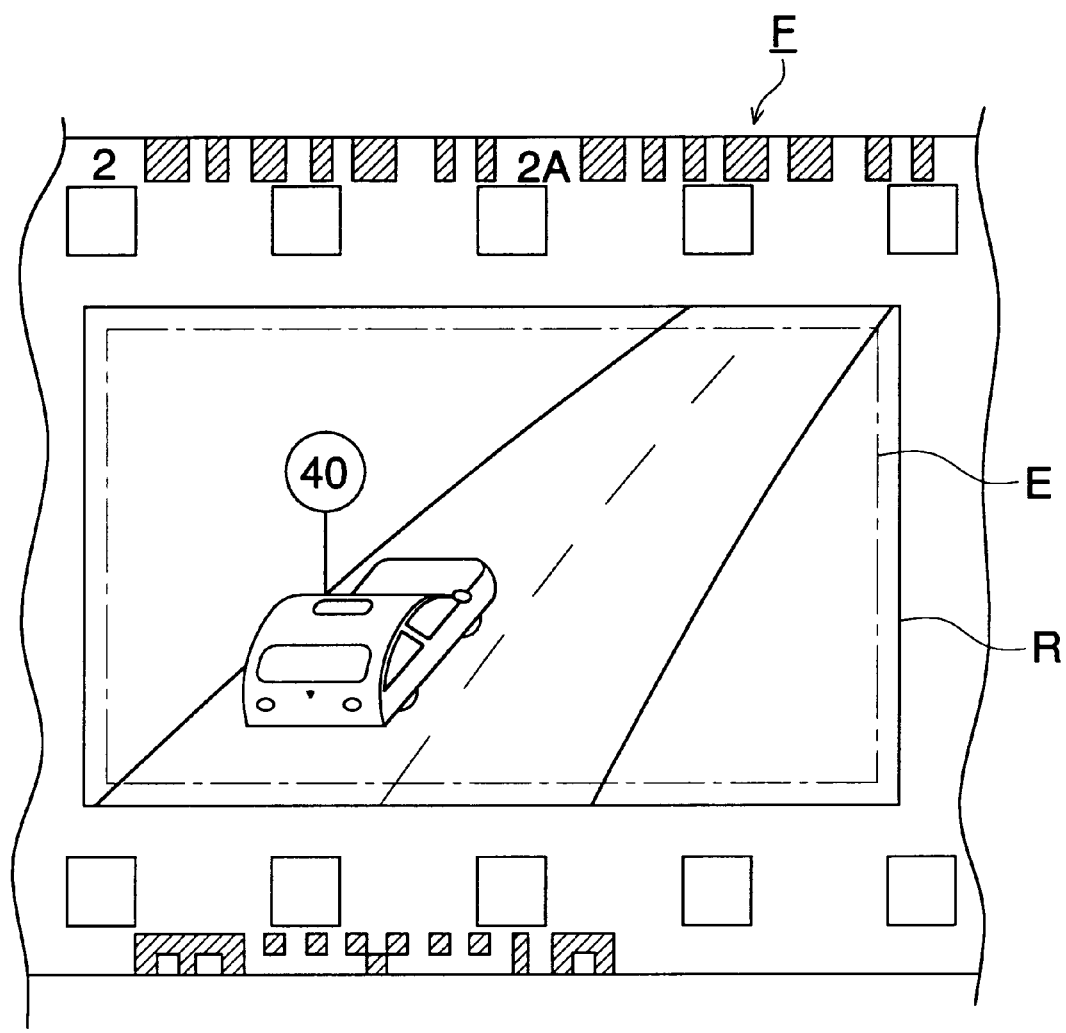

FIG. 9 is an enlarged view of a frame of a photographic film.

Each of FIGS. 10(a)–10(e) is a diagram showing illustratively the relation between photographic film F and light-sensitive material P in the course of exposure.

DETAILED DESCRIPTION OF THE PREFERRED EMBODIMENT

Figure 1:
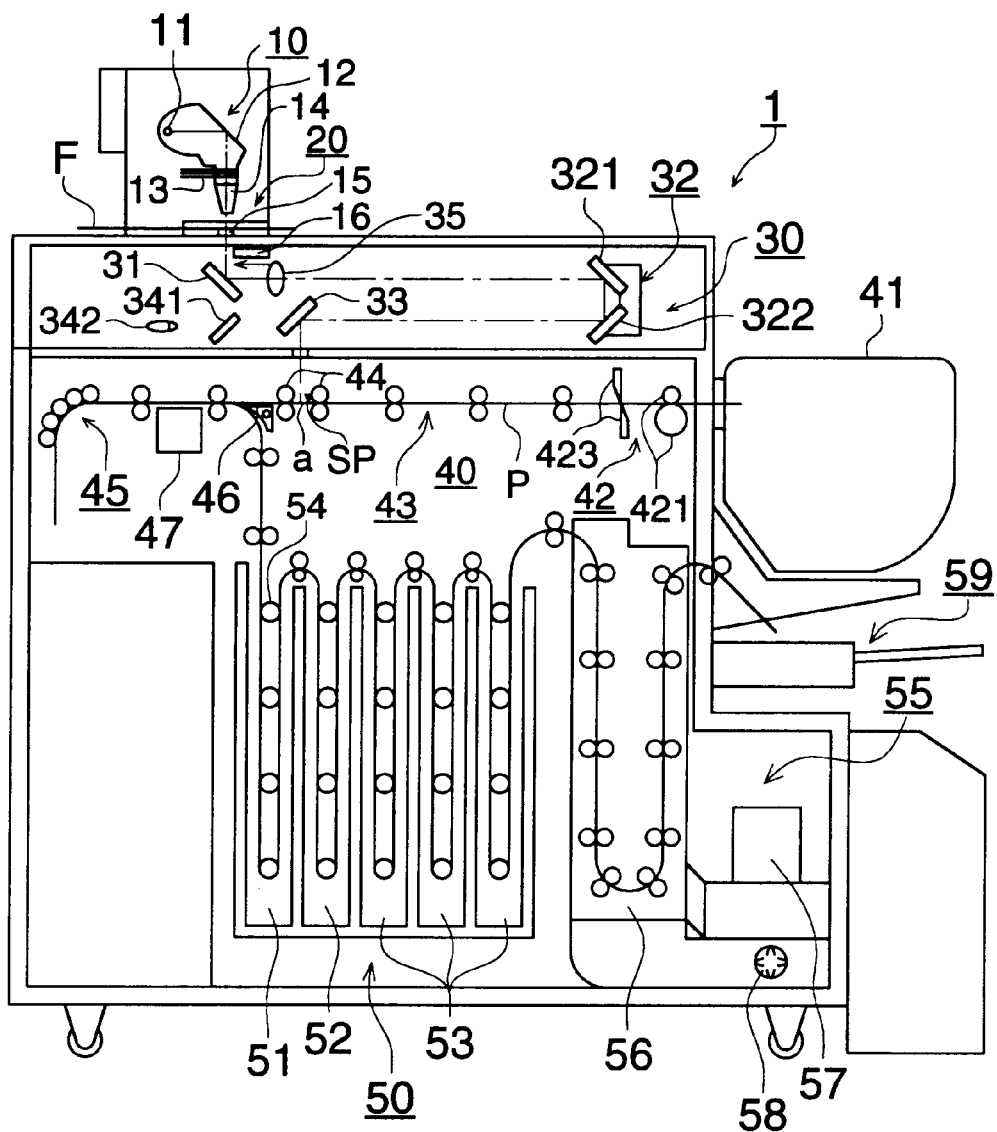
FIG. 1 is a schematic structure diagram of an image forming apparatus of a scanning exposure type to which the invention is applied.

An embodiment of the invention will be explained as follows, referring to the drawings. FIG. 1 is a schematic structure diagram of image forming apparatus 1 of a scanning exposure type to which the invention is applied.

The image forming apparatus 1 is an image forming apparatus of a scanning exposure type wherein photographic film F and light-sensitive material P are subjected to relative movement, and a slit image extending in the direction perpendicular mostly to the direction of the above-mentioned movement transmitted through or reflected on the photographic film F is projected on the light-sensitive material P for the scanning exposure, and it is composed of illuminating means 10, film holding means 20, optical means 30, conveying means 40, back marking means 47, developing means 50, drying means 55 and sorter 59.

First, the illuminating means 10 is a means to illuminate photographic film F with light. The illuminating means 10 is arranged on the upper part of a main body of the image forming apparatus 1, and is composed of light source 11 which emits white light, mirror 12 which reflects light emitted from the light source 11, yellow-magenta-cyan filter representing light-controlling means 13 which adjusts light quantity of reflected light depending on density of the photographic film F, and a mirror tunnel representing diffusing means 14 which diffuses the light adjusted in terms of light quantity. Adjustment of light quantity by means of the light-controlling means 13 is conducted by changing an amount of insertion of each filter in an optical path appropriately, based on a photometric value and a correction value of the photographic film F. A light flux emitted from the diffusing means 14 is changed in terms of its optical path by mirror 12, adjusted in terms of its light quantity by the light-controlling means 13, and is uniformalized by the diffusing means 14 to be projected on the photographic film.

The film holding means 20 arranged on the top of the main body of the image forming apparatus 1 holds photographic film F while maintaining flatness of its frame to be scanned during the scanning exposure, and it is a means to move, with scanning/moving means 25, an image of one frame of the photographic film by an amount equivalent to one frame in the scanning direction representing the horizontal direction in FIG. 1, for scanning an image of one frame among plural frames recorded on the photographic film F thus held, which will be stated later. The film holding means 20 has a function to release the holding of photographic film F and to advance a frame of the photographic film F, for changing the film to be scanned. Therefore, when images of plural frames recorded on the photographic film F need to be formed on a light-sensitive material, it is not necessary for a user to set the photographic film F for each frame, which improves work efficiency.

Incidentally, the scanning/moving means 25 is controlled so that the moving speed of a photographic film may be constant while an image of the photographic film is being projected on the photographic light-sensitive material.

A light flux emitted from the illuminating means 10 is transmitted through the photographic film F, then scans the photographic film F which is moving together with the film holding means 20, and then is led to the optical means 30 in the later stage through slit 15 which is a line-shaped opening provided on the main body of the image forming apparatus 1 and extending in the direction perpendicular to the page surface in FIG. 1. Incidentally, the film holding means 20 will be explained in detail in the later stage.

The optical means 30 is a means which leads a light flux transmitted through the photographic film F onto a light-sensitive material under the moving state which will be explained later through the slit 15 so that the light flux may be focused, and projects a slit image to position "a". The optical means 30 has therein first mirror 31, second mirror 321 provided on V mirror 32, third mirror 322 and fourth mirror 33, and it changes, with the aforesaid mirrors, an optical path (shown with one-dot chain lines in FIG. 1) of the light flux transmitted through the photographic film F, and projects a slit image transmitted through the photographic film F at the exposure position "a" with focusing means 35. Incidentally, the optical means 30 will be explained in detail later.

The first mirror 31 is moved by an unillustrated solenoid or motor in the direction perpendicular to the longitudinal direction of slit 15 to be able to retract from an optical path. When the first mirror retracts from an optical path, a light flux transmitted through photographic film F is led to photometric element 342 for photometry by photometric mirror 341 located right under the slit 15. The photometric element 342 is an element for measuring a quantity of light of a light flux transmitted through photographic film F for each of B, G and R, and it is used for light quantity adjustment conducted by the light-controlling means 13. When photometry is conducted, each filter which represents the light-controlling means 13 is set at the reference position (for example, full open (the filter is not located in an optical path)).

Shutter 16 is a member to open and close the slit 15, and the shutter is in the state of open at least in the course of photometry by means of the photometric element 342 and in the course of exposure to light-sensitive material P.

Though a light flux emitted by illuminating means 10 is transmitted through photographic film F, the light flux may also be reflected on the photographic film F for obtaining an image of the photographic film F.

Conveying means 40 is a means to convey light-sensitive material P such as a photographic paper to exposure position "a" and further to developing means. The conveying means 40 is composed of paper-feeding magazine 41, paper-feeding means 42, standby means 43, exposure section conveying means 44, conveyance path switching means 46 and reciprocating means 45. The paper-feeding magazine 41 is a magazine for housing a roll-shaped and unexposed light-sensitive material. Paper-feeding means 42 is a means which takes out light-sensitive material housed in the paper-feeding magazine 41 and cuts it to sheet-shaped light-sensitive material P having a prescribed length. The paper-feeding means 42 is composed of paired sheet-feeding rollers 421 which take out a light-sensitive material housed in paper-feeding magazine 41 and cutter 423 representing a cutting means which cuts the light-sensitive material P thus taken out to a prescribed length to make sheet-shaped light-sensitive material P.

The standby means 43 is a means which has plural paired rollers and makes the sheet-shaped light-sensitive material P to be on standby before the start of exposure, and makes light-sensitive material P which is being cut to be on standby. Incidentally, the plural paired rollers of the standby means 43 are structured to make pressure contact/releasing possible, and they are released in the course of exposure to light-sensitive material P so that no load may be given to the light-sensitive material P while it is being exposed.

Exposure section conveying means 44 is a means to convey light-sensitive material P at a constant and speed while the light-sensitive material is being exposed, and the light-sensitive material P is conveyed only by the exposure section conveying means 44 during exposure. The exposure section conveying means 44 is composed of a pair of rollers located at the upstream side and a pair of rollers located at the downstream side both of the exposure position "a" in the conveyance direction for the light-sensitive material P. While the light-sensitive material P is conveyed by the exposure section conveying means 44 in the relative movement direction (lateral direction in FIG. 1) which is a direction mostly perpendicular to the direction (perpendicular to the page surface in FIG. 1) wherein a slit image projected at the exposure position "a" extends, the light-sensitive material P is exposed in succession to a slit image of photographic film F scanned by illuminating means 10, film holding means 20 and optical means 30.

Conveyance of light-sensitive material P by means of the exposure section conveying means 44 is accelerated so that it reaches the prescribed constant speed by the time when the leading edge of the light-sensitive material P in its movement direction arrives at the exposure position "a". Light-sensitive material sensor SP which is a means for detecting a light-sensitive material is provided at the upstream side of the exposure position "a" in the direction of conveyance of light-sensitive material P, and it is a member to detect a leading edge in the conveyance direction of light-sensitive material P conveyed by exposure section conveying means 44 for scanning exposure. When the light-sensitive material P is detected by the light-sensitive material sensor SP, a movement of film holding means 20 is started, and photographic film F and the light-sensitive material P are synchronized, which will be explained later.

Conveyance path switching means 46 is a means to switch a conveyance path between the path for conveying the exposed light-sensitive material P to reciprocating means 45 on the downstream side and the path to convey the light-sensitive material P located in the reciprocating means 45 to developing means 50 which is further on the downstream side.

The reciprocating means 45 is a means which houses exposed light-sensitive material P temporarily, then changes the conveyance direction (changes a leading edge in the conveyance direction) for the light-sensitive material and conveys it to the developing means 50. This is to cause an emulsion side which is a light-sensitive layer of light-sensitive material P to face the inside of each processing tank and thereby to prevent scratches caused by a guide member (having no symbol number) at a U-turn section, when processing the exposed light-sensitive material P with the developing means 50. When the light-sensitive material P is conveyed directly to the developing means 50, skipping the reciprocating means 45, a jam is caused by a difference of conveyance speed in the developing means 50, and an unnecessary load is applied to the light-sensitive material P which is being exposed. Or, when a sufficient length of the conveyance path is taken for inhibiting an occurrence of a jam and for preventing that an unnecessary load is applied to the light-sensitive material P which is being exposed, it leads to a problem of a large-sized apparatus.

There is provided back marking means 47 between the conveyance path switching means 46 and the reciprocating means 45. The back marking means 47 prints a frame number and exposure conditions on the back side (surface that is opposite to the emulsion side) of light-sensitive material P when light-sensitive material P housed in the reciprocating means 45 is conveyed after being led to the path to developing means 50 switched by the conveyance path switching means 46.

As stated above, in the present embodiment, exposure position "a" is fixed, and a slit image of photographic film F projected on the exposure position "a" is exposed successively on light-sensitive material P that is being moved by exposure section conveying means 44, so that the light-sensitive material P is subjected to scanning exposure to an image of photographic film F. The minimum necessary condition for the foregoing is that the projected slit image and the light-sensitive material P are moving relatively.

The developing means 50 is a means to process exposed light-sensitive material P. The developing means 50 is composed of color developing tank 51 which conducts color developing of a light-sensitive layer of light-sensitive material P, bleach-fix tank 52 which bleaches and fixes the color-developed light-sensitive layer, stabilizing tank 53 which stabilizes the light-sensitive layer, and plural rollers 54 (partly illustrated) which convey light-sensitive material P successively into each of tanks 51–53.

Drying means 55 is a means to dry processed light-sensitive material P, wherein the processed light-sensitive material P is conveyed in dryer rack 56 representing a dryer section by plural paired rollers (having no symbol number) which represent a conveying means for processed light-sensitive material P, and air warmed by heater 58 representing a heating means is sent into the dryer rack 56 by dryer fan 57 representing an air blower means.

Sorter 59 is a means to sort light-sensitive material P dried and ejected out of image forming apparatus 1 for each order.

Operations of the image forming apparatus 1 for image forming will be explained as follows.

Roll-shaped light-sensitive material P housed in paper-feeding magazine 41 is fed out of the paper-feeding magazine 41 by paired sheet-feeding rollers 421, then conveyed by a pair of rollers of standby means 43, and cut by cutter 423 to a prescribed length to become sheet-shaped light-sensitive material P. The sheet-shaped light-sensitive material P stands by at the position of standby means 43, with its leading edge in the conveyance direction nipped at the entrance side of exposure section conveying means 44 (at the upstream side in the conveyance direction), until the moment when preparation of movement for scanning of film holding means 20 is completed (the moment when film holding means 20 stops at the starting position, which will be explained in detail, later). When preparation of the film holding means 20 is completed, light-sensitive material P which has been standing by is conveyed at a prescribed conveyance speed by exposure section conveying means 44.

On the other hand, when preparation of the film holding means 20 is completed, photographic film F starts moving in the scanning direction (direction toward right in FIG. 1) together with the film holding means 20, while synchronizing with light-sensitive material P conveyed by the exposure section conveying means 44, and a light flux emitted from illuminating means 10 illuminates the photographic film F held by the film holding means 20, and thereby the light flux scans an entire surface on an image area of a frame of the photographic film F when the photographic film F moves in the scanning direction (direction toward right in FIG. 1) together with the film holding means 20. An optical path of a light flux transmitted through the photographic film F is deflected by first mirror 31, second mirror 321, third mirror 322, and fourth mirror 33 and a slit image is projected at exposure position "a" by focusing means 35.

Light-sensitive material P which has been standing by is conveyed by the exposure section conveying means 44 through synchronization, so that the light-sensitive material P may be exposed to a slit image to be projected at the exposure position "a" after being transmitted through photographic film F. In this case, a means to convey light-sensitive material P other than the exposure section conveying means 44 releases pressure contact with the light-sensitive material P by means of a pair of rollers at standby means 43, for example, so that no driving power may be applied to the light-sensitive material P. An entire surface of the light-sensitive material P conveyed by the exposure section conveying means 44 through synchronization with the scanning of photographic film F is exposed to an image of the photographic film F.

The leading edge of the light-sensitive material P which is being exposed is conveyed toward reciprocating means 45 by conveyance path switching means 46. When exposure to the light-sensitive material P is completed, the conveyance direction for the light-sensitive material P is reversed by the reciprocating means 45 and the light-sensitive material P is led to developing means 50 by the conveyance path switching means 46. In this case, a frame number and exposure conditions are printed by back marking means 47 on the reverse side of the light-sensitive material P.

The light-sensitive material P conveyed to the developing means 50 is then conveyed to be processed, with its emulsion side facing inside, by plural rollers 54 to color developing tank 51, bleach-fix tank 52 and stabilizing tank 53 in succession. Light-sensitive material P whose processing has been completed is then dried while being conveyed through the inside of drier rack 56 by pairs of rollers, and then is ejected out of an apparatus.

After the scanning exposure is completed, the film holding means 20 conveys a photographic film to the following frame, and scanning exposure and processing are conducted in the same manner as in the foregoing for light-sensitive material P which is then ejected out of the apparatus. The light-sensitive material P thus ejected out is sorted by sorter 59 for each order.

Next, optical means 30 will be explained in detail as follows, referring to FIG. 8 which is a perspective view of the optical means. Incidentally, a solenoid and a motor which move photometrical element 342, photometrical mirror 341, and first mirror 31 are for photometry use, and they are not shown in FIG. 8 and explanation for them is omitted here.

As stated above, optical means 30 is a means to lead a light flux (shown with one-dot chain lines in FIG. 8) transmitted through photographic film F and has passed through slit 15 onto a light-sensitive material which is moving for image forming to be focused, and to project a slit image at exposure position "a". Namely, the optical means 30 wherein an optical path of a light flux transmitted through photographic film F is deflected by first mirror 31, second mirror 321 and third mirror 322 both provided on V-mirror 32, and fourth mirror 33, projects a slit image transmitted through photographic film F at exposure position "a" with focusing means 35.

In the optical means 30 mentioned above, the V-mirror 32 and the focusing means 35 are structured to be capable of moving from side to side in FIG. 1 so that magnification can be changed. Therefore, magnification is changed by moving the V-mirror 32 and the focusing means 35, and whereby by changing an optical path length with the focusing means 35 serving as the center position. In further explanation of this arrangement, a wire (having no symbol number) is trained about a pulley (having no symbol number) provided on a shaft of motor 323, and a part of the wire is connected with the V-mirror 32. Therefore, when the motor 323 is driven regularly and reversely, the V-mirror 32 is moved. Further, even with regard to the focusing means 35, it is arranged so that a motor (not shown) drives focusing base body 351 carrying thereon the focusing means 35 to move from side to side in FIG. 1 while being guided by a pair of guides 352.

As stated above, it is possible to change magnification by moving the focusing means 35 and V-mirror 32. In the present embodiment, however, the focusing means 35 and switching means 36 are arranged as stated below so that magnification to be changed may have a certain range to cope with various formats.

In the present embodiment, focusing means 35 has therein plural focusing means representing first focusing means 353, second focusing means 354 and third focusing means 355. Each of these first focusing means 353, second focusing means 354 and third focusing means 355 is composed of a single focus lens whose focal length is different with each other. Switching means 36 which switches these plural focusing means 353–355 selectively selects from a plurality of focusing means 353–355 one image forming means which projects light transmitted through photographic film F on exposure position "a". Due to the arrangement mentioned above wherein plural focusing means 353–355 each having a different focal length can be used selectively, it is possible to make the magnification to be changed to have a certain range to cope with various formats.

Now, switching of plural focusing means 353–355 will be explained in detail as follows.

In the present embodiment, a plurality of focusing means 353–355 are arranged in parallel on switching focusing base body 361 in the direction in which a slit image extends. Since this switching base body 361 is provided on focusing base body 351 through guide 363, it can move in the optical axis direction (lateral direction in FIG. 1) together with the focusing base body 351. To this switching base body 361, there is connected a part of a wire (having no symbol number) trained about a pulley (having no symbol number), and this wire is connected also to a shaft of motor 362. Therefore, when the motor 362 is driven, the switching base body 361 on which a plurality of focusing means 353–355 are mounted can move in the direction in which a slit image extends while being guided by guide 363. It is therefore possible to use a plurality of focusing means 353–355 each having a different focal length selectively by controlling the motor 362 for regular rotation or reverse rotation. In the arrangement of the present embodiment, therefore, a plurality of focusing means 353–355 each having a different focal length can be used selectively in addition to a magnification change attained by moving V-mirror 32 and focusing means 35 and thereby by changing an optical path length with focusing means 35 serving as the center. It is therefore possible to make the magnification to be changed to have a certain range to cope with various formats.

In the present embodiment, a plurality of focusing means 353–355 are arranged in parallel in the direction in which a slit image extends, and they are arranged to be capable of moving in the aforesaid direction. It is therefore possible to structure an image forming apparatus to be compact. There is further provided light-shielding plate 356 at the downstream side of focusing means 35 in the advancing direction of light and on focusing base body 351. On this light-shielding plate 356, there is provided opening 357 through which the light passing through the selected focusing means passes and arrives at a focusing position, and the light passing through the unselected focusing means is shielded by light-shielding plate 356 and thereby does not reach the image-forming position. It is therefore possible to avoid a bad influence (interference) caused by the unselected focusing means.

In the explanation stated above, magnification in the direction in which a slit image extends is changed by moving V-mirror 32 and focusing means 35 in the optical axis direction (lateral direction in FIG. 1). However, magnification in the direction perpendicular to the direction in which a slit image extends is changed by changing a conveyance speed for light-sensitive material P at exposure position "a". Further, though three focusing means represented by first–third focusing means 353–355 are provided as focusing means 35 in the present embodiment, it is also possible to provide, without being limited to the foregoing, two or more focusing means.

In addition, the present embodiment is structured as follows so that an image (an up image) wherein an image for one frame recorded on photographic film F is arranged in the direction in which a slit image extends may be formed on a sheet-shaped light-sensitive material.

In the present embodiment, first–third focusing means 353–355 are provided as focusing means 35, and the third focusing means 355 among them is assumed to be a focusing means for forming an up image. When forming an up image, the third focusing means 355 is selected by switching means 36. The third focusing means 355 is composed of plural (two in the present embodiment) single focal length lenses each having a focal length which is mostly the same as others. A focal length of each of two lenses of the third focusing means 355 is different from that of the first and second focusing means 353 and 354. An image (slit image) focused by the third focusing means 355 is a focusing means for forming an up image such as a 2-up image or a 4-up image representing an image wherein same images are arranged in the direction (direction in which a slit image extends) perpendicular to the conveyance direction for a photographic paper, and two lenses are arranged in the direction in which a slit image extends so that slit images projected by two lenses may be arranged in the direction in which a slit image extends.

The third focusing means 355 in the present embodiment is structured so that slit images formed (projected) respectively by two lenses of the third focusing means 355 may not be superposed on light-sensitive material P. Namely, a prescribed distance between two lenses of the third focusing means 355 is maintained for arranging the two lenses so that projected slit images may not be superposed. Further, the present embodiment is structured so that magnification may be changed as stated above, and even in the case of forming an up image, magnification in the direction in which a slit image extends is changed by moving V-mirror 32 and focusing means 35 in the optical axis direction (lateral direction in FIG. 1), and magnification in the direction perpendicular to the direction in which a slit image extends can be changed by changing a conveyance speed for light-sensitive material P at exposure position "a". In this case, when magnification is changed without changing a distance between two lenses of the third focusing means 355, slit images are superposed when magnification is raised, while a distance between images is increased, making the images to be unattractive when magnification is lowered. Therefore, lens distance changing means 358 is provided in the present embodiment. The lens distance changing means 358 is a means to change a distance between two lenses of the third focusing means 355 so that images are not superposed depending on magnification.

In the present embodiment, for the purpose to prevent that slit images are superposed, two lenses are arranged in parallel at a lens distance with which slit images formed respectively by the two lenses are not superposed. However, when there is a possibility that slit images formed by the two lenses are superposed on light-sensitive material P, it is also possible to provide a light-shielding means between third focusing means 363 and exposure position "a" so that an area having a possibility of superposing may be shielded.

Though two lenses are used as the third focusing means 355 for forming an up image in the present embodiment, three or more lenses may also be used, without being limited to the use of two lenses. Further, it is also possible to employ a method wherein the same original is subjected to plural scanning exposures and thereby plural images of an original are formed in the relative movement direction on a light-sensitive material. In addition, during a period from completion of certain scanning exposure to the start of following scanning exposure in the plural scanning exposures, a relative movement may be suspended, or the speed of the relative movement may be made slower than that in the course of the exposure. Further, during a period from completion of certain scanning exposure to the start of following scanning exposure in the plural scanning exposures, it is preferable that light to be transmitted through or reflected on an original is put out, or light which has been transmitted through or reflected on an original is shielded so that the light may not be projected on a light-sensitive material.

Figure 2:
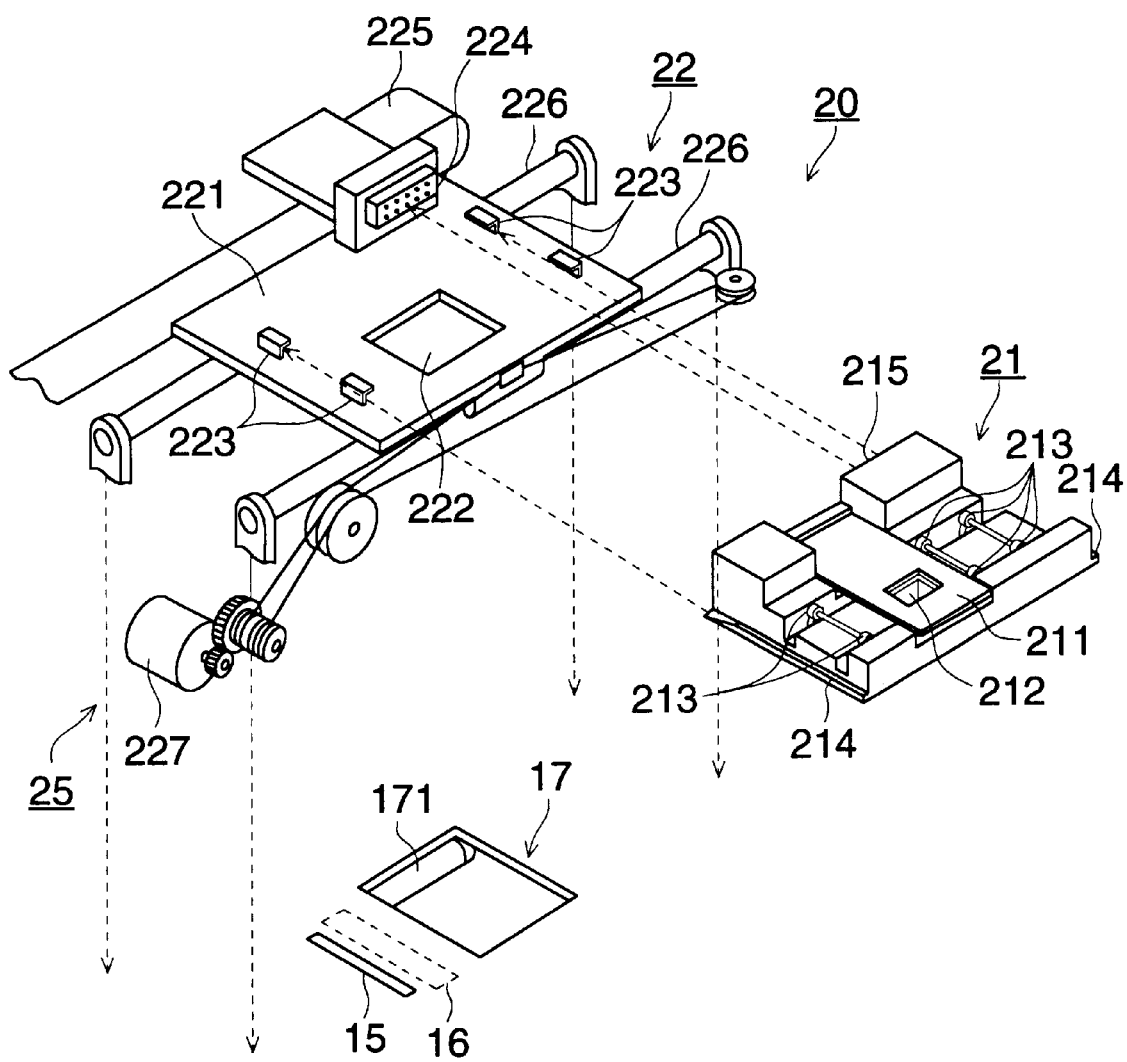
FIG. 2 is a perspective view of a film holding means.

Next, film holding means 20 will be explained as follows, referring to FIG. 2 which is a perspective view of the film holding means. In addition to the film holding means 20. FIG. 2 also shows scanning/moving means 25 which moves the film holding means 20 (in other words, to move a photographic film for scanning), slit 15, shutter 16 and viewer 17 which is not shown in FIG. 1.

As stated above, the film holding means 20 holds photographic film F while maintaining flatness of one frame of the photographic film F during at least a period of exposure, and for scanning an image of one frame among plural frames recorded on the photographic film F thus held, and the image of one frame to be scanned of the photographic film F is moved by an amount equivalent to one frame in the scanning direction which is a lateral direction in FIG. 1, by the scanning/moving means 25. The film holding means 20 has further functions to release the holding of photographic film F and to advance a frame of the photographic film F for changing the frame to be scanned. These functions will be explained as follows, referring to concrete structures.

The film holding means 20 is composed of feeder 21 which serves as a flatness maintaining means for maintaining flatness of photographic film F that tends to suffer curling and as a frame-advancing means for advancing frames and of carriage 22 which holds the feeder 21 and moves photographic film F together with the feeder 21 in the scanning direction, and they are structured so that photographic film F is moved when the feeder 21 and the carriage 22 (namely, film holding means 20) are moved in the scanning direction.

In the present embodiment, as stated above, the film holding means 20 is divided into the feeder 21 and the carriage 22. The reason for this is to make it possible to replace feeder 21 for each format in various formats of photographic film F such as 110, 120, 135 and I×240. Further, when a film is moved directly for scanning, it is difficult to maintain flatness of photographic film F which tends to suffer curling, and thereby it is impossible to expose light-sensitive material P to an image appropriately. However, it is possible to conduct appropriate scanning exposure while maintaining flatness, by moving the carriage 22 (feeder 21 held by the carriage 22 and photographic film F held by the feeder 21) a s in the present embodiment.

In the present embodiment, a flatness maintaining means and a frame-advancing means are united solidly as feeder 21, and the feeder 21 can be mounted on or dismounted from the carriage 22 (which is also an image forming apparatus main body). However, the flatness maintaining means and the frame-advancing means can also be made possible to be mounted on or dismounted from the carriage 22 independently, without being limited to the foregoing. It is further possible to unite the feeder 21 and the carriage 22 solidly.

The feeder 21 has therein pressure contact plate 211 urged upward which is a direction to release with elastic force such as a spring which is an unillustrated elastic means, and it functions as a film holding means. On this pressure contact plate 211, there is provided opening 212 corresponding to each format of photographic film F, and the pressure contact plate 211 is driven by a driving member such as an unillustrated solenoid against elastic force to come in pressure contact with photographic film F, and holds the photographic film F while maintaining its flatness in the course of scanning of the photographic film F. When the driving member is released from the driving therefor, the pressure contact plate 211 is released from its pressure contact with photographic film F by elastic force.

The feeder 21 is provided with plural pairs of rollers 213, and photographic film F is nipped between the paired rollers. These plural paired rollers 213 function as a positioning means for positioning a frame of photographic film F, a frame-advancing means for advancing photographic film F at an interval of each frame and as an inserting/ejecting means for inserting photographic film F into or ejecting it out of the feeder 21, and these paired rollers are driven by an unillustrated motor provided on the feeder 21 for positioning and frame-advancing for photographic film F and for insertion and ejection of photographic film F for the feeder 21 when pressure contact of the pressure contact plate 211 with photographic film F is released. On the feeder 21, there is further provided engagement portion 214 which engages with portions to be engaged 223 on carriage base 221 described later. The solenoid and the motor mentioned above receive power supply and control signals from connector 215 provided on the rear side of the feeder 21 to be driven and controlled.

The carriage 22 holds the feeder 21 and has therein carriage base 221 which is capable of moving in the scanning direction (the direction perpendicular to the longitudinal direction of slit 15). On the carriage base 221, there is opening 222 at the position corresponding to opening 212 of the feeder 21. This opening 222 is greater than the format in the maximum size which can be handled by image forming apparatus 1 so that plural formats of photographic film F can be covered. On the carriage base 221, there are further provided portions to be engaged 223 which engage with engagement portion 214 of the feeder 21 and connector 224 connected with connector 215 of the feeder 21. The portions to be engaged 223 on the carriage base 221 function as a holding means which holds the feeder 21, and when they engage with engagement portion 214 of the feeder 21, the feeder 21 is held by the carriage base 221. On the carriage base 221, there is provided flexible base plate 225 connected at its one end to the main body of image forming apparatus 1 and folded to be connected at the other end thereof to the carriage base 221, and power supply and control signals are given to the solenoid and the motor of the feeder 21 through the flexible base plate 225 and connectors 224 and 215.

The carriage 22 has therein a pair of guides 226 for guiding movement of the carriage base 221 and driving motor 227 for moving the carriage base 221, as a scanning/moving means which moves the carriage base 221 in the scanning direction. The driving motor 227 drives a wire (having no symbol number) trained about pulleys through gears (having no symbol numbers), and this wire is connected with carriage base 221 which thereby can reciprocate in the scanning direction when the driving motor 227 makes regular turn and reverse turn. In this case, the carriage base 221 slides on guide 226 to be guided straight.

Further, there are provided slit 15 and viewer 17 on image forming apparatus 1 at the location which is within a movement range (range of reciprocation in the scanning direction) of opening 222 of carriage 22 and under the opening 222. Further, under the slit 15, there is provided shutter 16 which is a light-shielding means for opening and closing the slit 15. This shutter 16 is driven by a solenoid which is an unillustrated driving means. Incidentally, when the shutter 16 is at the position of "open", light is passed to optical means 30 on the latter part through this slit 15. When the shutter 16 is at the position of "closed", light is not passed to optical means 30. The viewer 17 is a means for surface illumination that is for observing an image of photographic film F directly, and light emitted from light emission means 171 such as a fluorescent lamp is mad e to be a surface illuminant by means of a light-guiding plate or a reflecting plate, and photographic film F held by feeder 21 is illuminated by a light flux emitted from the surface illuminant to be observed by a user.

Next, the movement on the synchronization of the photographic film F with the light-sensitive material P is explained with reference to FIGS. 3(a) to 3(f) in which the operation of the film holding means 20 (feeder 21 and carriage 22) and the exposure section conveying means 44 is illustratively shown. FIGS. 3(a) to 3(f) show illustratively the operation of the film holding means 20 when a scanning exposure is performed upon inputting a correction value to each frame of the photographic film F.

Further, in FIGS. 3(a) to 3(f), the home position sensor SH is provided which is a first detecting means to detects the fact that the film holding means 20 has positioned (opening 222 positions above the viewer 17, that is, the position where an image of the photographic film F held by the carriage 22 via the feeder 21 can be visually observed, hereinafter, referred to as home position) over the viewer 17. Furthermore, in order to decide a position (start position) at which the movement for scanning starts, the start sensor SS is provided which is a second detecting means to detect the fact that in the reverse side of the home position against the slit 15, the film holding means 20 positions at the start position. Moreover, in order to detect the top end in the conveying direction of the light-sensitive material conveyed by the exposure section conveying means 44 for scanning exposure, the light-sensitive material sensor SP which is the light-sensitive material detecting means is provided in the upper stream side of the conveying direction of the light-sensitive material P against an exposure position "a". Furthermore, in the present embodiment, the home position sensor SH and the start sensor SS are fixed at a prescribed position, while the light-sensitive material SP is provided so that it can change a position along a distance of x in the light-sensitive material conveying direction from a by a driving means not shown in the figure. Further, in the present embodiment, it is constructed in such a manner that when the light-sensitive material sensor SP detects the light-sensitive material P, the signal becomes a trigger and the movement of the carriage 22 starts.

At first, a case is explained in which the image of the photographic film F is exposed under a prescribed magnification $m_0$ (hereinafter referred to as reference magnification) to the light-sensitive material P which is conveyed at a speed of $P_0$. At the time, the moving speed of the carriage 22 is $P_0/m_0$ and the distance from the exposure position "a" necessary for the image of the photographic film F brought into synchronization with the light-sensitive material P in the conveying direction is represented by $x_0$. Further, the moving speed described herein means a speed at a stationary state and the stationary state is maintained during a period while the image of the photographic film F is exposed to the light-sensitive material P.

Figure 3A:
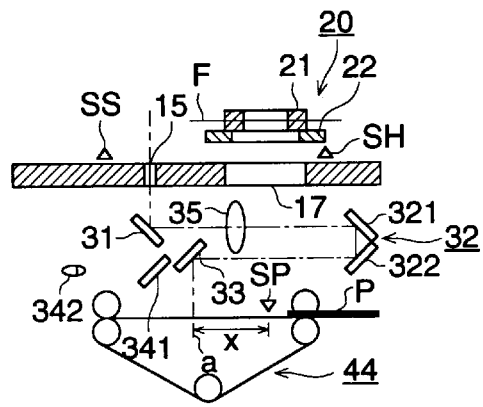

The first frame (in the figure, an image of the photographic film F corresponding to the opening 212 of the feeder 21) of the photographic film F is set in the feeder 21 and the carriage stops in such a state (at the home position) that the opening 212 of the feeder 21 positions over the viewer 17 (FIG. 3(a)). At the time, the carriage 22 is detected by the home position sensor SH. Herein, a light emitted from the viewer 17 transmits through the first frame of the photographic film F and an operator confirms the image of the first frame. And upon adjusting the position of the first frame, the operator makes judgment employing the transmitted image and inputs a correction value when found the correction for color failure, etc. On the other hand, the light-sensitive material P is nipped by the exposure section conveying means 44 and is in a standby state.

Figure 3B:
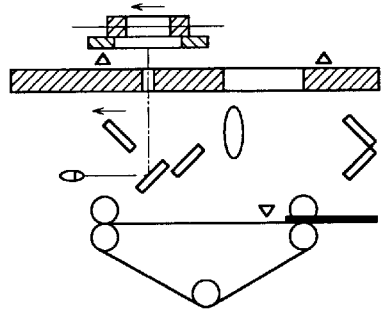

When the judgment or input is completed, the carriage 22 is moved in the left direction (FIG. 3(b)) while the feeder 21 holds the photographic film F (photographic film is brought into pressure contact employing the pressure plate 211). During the movement, the opening 212 passes over the slit 15 and an amount of light which is illuminated from the illuminating means and transmits the image of the first frame is measured by the photometric element 342. Further, prior to this, the first mirror 31 is withdrawn from the light path so that a light flux passing through the slit 15 is led to the photometric element.

And the carriage 22 is detected with the start sensor SS. Namely, when the carriage 22 reaches the start position which is a position to the movement for the scanning exposure, the movement of the carriage is terminated (FIG. 3(c)). At the time, when photometry is completed, according to the input correction value and the photometric value obtained by the photometry, the first mirror 31 is returned to the light path and the light-controlling means 13 is controlled and the light amount is adjusted. In this stage, the preparation for the movement for scanning of the film holding means 20 is completed. Further, up to this stage, the light-sensitive material sensor SP has finished moving to the position having a distance of $x_0$, in the conveying direction of the light-sensitive material P, from the exposure position necessary for bringing the image of the photographic film F into synchronization with the light-sensitive material P.

When the carriage base body 221 positions at the start position, the conveyance having a speed of $P_0$ of the light-sensitive material P held waiting by the exposure section conveying means 44 starts. And when the light-sensitive material sensor SP detects the top of the light-sensitive material P conveyed by the exposure section conveying means 44, immediately, the carriage 22 for scanning the first frame image of the photographic film F is moved at a prescribed speed of $P_0/m_0$ in the right direction in the figure, and the light-sensitive material P conveyed by the exposure section conveying means 44 comes into synchronization (FIG. 3(d)).

Figure 3C:
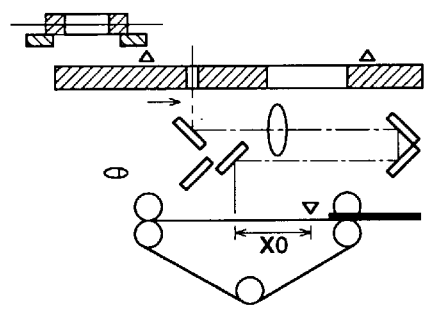
Figure 3D:
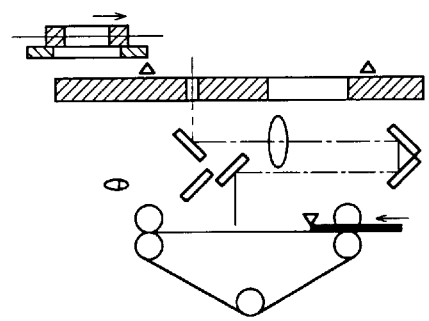
Figure 3E:
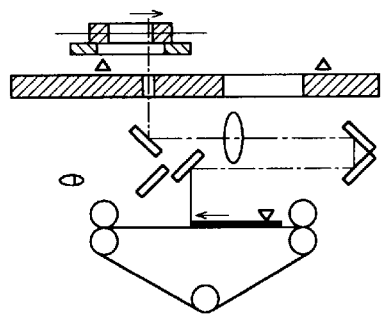
Figure 3F:
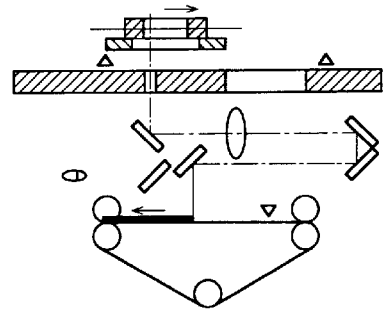

And after a slit image corresponding to the image transmitting the image of the photographic film moving together with the carriage 22 is projected on the exposure position "a", the light-sensitive material P passes on the exposure position "a" (FIG. 3(e)). Namely, after the image of the photographic film F is projected, an exposure is performed to the light-sensitive material P so that a margin part carried by the image of the photographic film F is not exposed to the light-sensitive material and furthermore, a loss of the light amount caused by the edge of the opening 222 of the feeder 21 is prevented. Furthermore, as is seen from these, the light-sensitive material sensor SP is moved by a distance of $x_0$ apart from the exposure position so that a period of time (taking into account the conveying speed of the light-sensitive material P) necessary to enable the light-sensitive material P to pass (that is, synchronized) over the exposure position "a" is secured after the carriage 22 starts moving from the start position (fixed position) and the top (end side in the moving direction for scanning) positions on the slit 15.

The margin described herein is explained with reference to FIG. 9.

In the photographic film F, images photographed by a camera and obtained by photographic processing is formed in a rectangular image region R composing of one frame. On the other hand, an angle of view in a camera is set so that the image region R of the photographed image is larger, for example, a few millimeter in the case of a 135 film size (24×36 mm). On account of this, a region formed by exposing an image recorded in a photographic film to photographic paper is not the image region R described above and exposure is required so that an image in an exposure region E is formed while setting the margin in this region.

In this manner, in an image forming apparatus in which an image of the photographic film is exposed to the photographic paper, for the image region R of one frame recorded on the photographic film F, the exposure region E which is smaller than the image region R provided with a margin should be exposed to the photographic paper.

As shown in FIG. 9, the image recorded on the photographic film F is provided with the margin and a region of the image which a photographer intends is the exposure region E which is smaller than the image region R recorded on the photographic film. On account of this, it is preferable that in the present embodiment, taking into account of the margin, synchronization conveyance of the photographic film R and the light-sensitive material P are performed as follows.

The foregoing is explained with reference to FIGS. 10(*a*) to 10(*e*). The photographic film is moved in the arrow direction by the film moving means 20, while the light-sensitive material P is moved in the arrow direction by the exposure section conveying means 44 and both are moved relatively.

At first, when a slit image corresponding to the top portion (top portion of the photographic film F in the moving direction) of the image region R of one frame recorded on the photographic film F is projected to the exposure position employing the focusing means 35, as shown in FIG. 10(*a*), the light-sensitive material P is not present on the exposure position "a". And when the photographic film F and the light-sensitive material P are further moved, the margin is separated from the top portion of the image region of the photographic film P, that is, when the slit image corresponding to the top portion of the exposure region E is projected to the exposure position, as shown in FIG. 10(*b*), the conveyance is performed so that the top portion (top portion of the light-sensitive material in the moving direction) of the light-sensitive material positions on the exposure position. Furthermore, when the photographic film F and the photosensitive P are conveyed; the image in the exposure region E of the photographic film is subjected to scanning exposure (FIG. 10(*c*)) and the slit image corresponding to the end portion of the exposure region E of the photographic film F is projected to the exposure position, as shown in FIG. 10(*d*), the conveyance is performed so that the end portion of the light-sensitive material P positions on the exposure position. Thereafter, furthermore, the photographic film F and the light-sensitive material P are conveyed and when the slit image corresponding to the end portion of the image region R of the photographic film F is projected to the exposure position by the focusing means 35, as shown in FIG. 10(*e*), the light-sensitive material P is not present on the exposure position "a".

In this way, when the slit image corresponding to the end position of the image region R of the photographic film F is projected on the exposure position, the light-sensitive material is not present on the exposure position. As a result, the margin portion of the photographic film F is not exposed to the light-sensitive material P. Thus, it is possible to provide a scanning exposure type image forming apparatus and an image having the same size that a photographer intends is preferably formed.

Further, in the explanation according to these FIGS. 10(*a*) to 10(*e*), it is shown that the photographic film F, as it is, is moved. However, a mask (provided in the film moving means 20, having a narrower opening than that of the image region R and the member which reduces the image region R) may be provided. Generally, when utilizing the mask, a problem is caused in that near the boundary of the mask, a light amount becomes insufficient due to the thickness of the mask. On the other hand, according to the present invention, when the scanning exposure is performed employing the mask, the problem of the shortage of the exposure amount is not caused by the operation in that after the slit image corresponding to the top portion of the image (in this case, the image corresponding to the size of the mask) is projected to the exposure position (at the time, the light-sensitive material P is not present on the exposure position.), the light-sensitive material P is conveyed to the exposure position and the scanning exposure is initiated on the light-sensitive material P.

An exposure after the projection is, in other words, a distance from a projected image with a projection distance (FIG. 10(*a*)) which is a distance in the relative moving direction in terms of the magnification of the projection of the image region of the photographic film F by the focusing means 35 to a projected image in FIG. 10(*e*), and according to FIG. 10(*e*)) is an exposure distance (distance from a projected image (FIG. 10(*b*)) to a projected image in FIG. 10(*d*); refer to FIG. 10(*e*); in the present embodiment, the length of the light-sensitive material P) becomes shorter. Furthermore, in view of another standpoint, exposure time (time from FIG. 10(*b*) to FIG. 10(*d*)) which is exposure time to the light-sensitive material P becomes shorter than projection time (time from FIG. 10(*a*) to FIG. 10(*e*)) during which the image region of the photographic film F is projected. Furthermore, such a control may be performed based on prescribed starting (waiting) point of the movement of the light-sensitive material, timing of the start of the movement of the light-sensitive material, timing of the movement of the photographic film and the light-sensitive material, exposure timing, etc. according to the magnification or may be decided by the calculation according to the relative moving speed, etc. when desired.

Furthermore, in the image forming apparatus, the moving speeds of the photographic film F by the film moving means 20 and the light-sensitive material P by the exposure section conveying means 44 are controlled so as to be in a constant speed during scanning exposure of an image of the photographic film F to the light-sensitive material P. Furthermore, in order to make the moving speed of the photographic film F constant, the photographic film F which stops at a prescribed position (position from which the movement starts for scanning.) is accelerated. At this time, it is not necessary to accelerate at the end portion of the image region of the photographic film F but the acceleration may be conducted so that the constant speed is achieved prior to the exposure to the light-sensitive material P. In other words, the exposure to the light-sensitive material P is termed a reference (matched the time when the end portion of the light-sensitive material P reaches the exposure position).

Namely, because the light-sensitive material P is conveyed at a constant speed by the exposure section conveying means 20, it is not necessary that the movement of the photographic film F by the film moving means 20 is in a constant speed at the state in FIG. 10(*a*) but before becoming the state in FIG. 10(*b*), the acceleration is performed so as to be in a constant speed. At latest, the constant speed is maintained up to the state in FIG. 10(*d*).

As mentioned above, the relative movement (in the present embodiment, scanning of the photographic film F) of the photographic film F and the light-sensitive material P is accelerated so as to be in a constant speed prior to the exposure to the light-sensitive material P and is controlled so as to maintain the constant speed during exposure. As a result, it is possible to provide an image forming apparatus in which peculiar problems of the photographic film F are considered, and formed images (light-sensitive material) exhibit no unevenness and excellent images can be obtained. Furthermore, it is possible to shorten the time before starting the relative movement (scanning). The image region R of the photographic film F is not exposed but the exposure region E is exposed to the light-sensitive material. Thus, it is possible to shorten an approach distance for the acceleration by the margin and the time is preferably shortened.

After that, the light-sensitive material P is conveyed at a prescribed speed of $P_0$ by the exposure section conveying means 44; the carriage 22 is moved at a prescribed speed of $P_0/m_0$ by the scanning/moving means 25; is the photographic film F and the light-sensitive material P comes into synchronization and an image of the photographic film F is scan exposed to the light-sensitive material P. And when the light-sensitive material P passes over the exposure position "a", the scanning exposure is completed (FIG. 3(f)). At the time, namely, even after the light-sensitive material P passes over the exposure position "a", the state in that the slit image corresponding to the image of the photographic film F is projected to the exposure position is, as mentioned above, caused by the margin and the loss of the light amount.

After that, when a scanning exposure of an image of the first frame of the photographic film F is completed, the carriage 22 keeps moving (increasing the moving speed) in the right direction in the figure until the carriage 22 is detected by the home position sensor SH and when positioning at the home position, it stops (FIG. 3(a)). At the time (during movement or stop of the carriage 22), the feeder 21 releases the pressure contact of the photographic film F by the pressure contact plate 211 and furthermore, advancing a frame by driving a pair of rollers 213 so that the second frame of the photographic film F positions at the opening 212. And when advancing the frame is completed by the feeder 21, the photographic film F is brought into pressure contact by the pressure contact plate 211.

On the other hand, the scan-exposed light-sensitive material P is conveyed to the reciprocating means and then, the developing means, as mentioned above.

Such processes (FIGS. 3(a) to 3(f)) are repeated, that is, a correction value is input for every frame and a scanning exposure is performed. Further, scanning may be performed from a frame (generally, the sixth frame but not limited to the frame) of the reverse side of the first frame of the photographic film F.

The photographic film includes various formats (110, 120, 135, I×240 (APS) etc.) and the light-sensitive material includes various formats (E size, L size, postcard, cabinet, 2L, 2L wide, 8×10 inch size, 10×12 inch size, panorama, high-vision, etc.). Therefore, it is necessary to expose images of the photographic film F as an original to the light-sensitive material P employing various projection magnifications. On account of this, in the present embodiment, in order to change the projection magnification, by moving the V mirror 32, the magnification in the direction of the extension of the slit image is changed by changing the optical length positioning the focusing means 35 in the center and furthermore, the construction is carried out so that the conveyance can be performed by changing the relative moving speed of the photographic film F and the light-sensitive material P.

The change in the relative moving speed of the photographic film F and the light-sensitive material P is herein described in detail. In order to change the relative moving speed, construction is performed so that the moving speed of the photographic film F (carriage 22) and the conveying speed (conveying speed in the exposure section conveying means 44) can be changed individually. As explained in FIGS. 3(a) to 3(f), in the case of defining the reference position of the sensor SS as the start position, when an image of the photographic film F is exposed under the magnification $m_0$ to the light-sensitive material P conveyed at a speed of $P_0$, in the case of exposing under the magnification m1 an image of the photographic film F to the light-sensitive material P, the exposure section conveying means 44 and the scanning/moving means 25 are controlled so that the followings are held.

$$\text{Speed of light-sensitive material } P \text{ at the constant speed} = \frac{m_1(m_0+1)^2}{m_0(m_1+1)^2} P_0 \quad \text{(Formula 1)}$$

$$\text{Speed of photographic film } F \text{ at the constant speed} = \frac{(m_0+1)^2}{m_0(m_1+1)^2} P_0$$

Further, according to a principle, a ratio of the moving speed of the photographic film F to the moving speed of the carriage 22 may be changed. For that, the speed of one of them is fixed and the speed of the other is changed. However, as is seen in the present embodiment, when photographic paper is employed as the light-sensitive material P, the speed is not decided only by the magnification. Because an exposure amount (illuminance) is involved, when changing the magnification, the moving speeds of both of the light-sensitive material P and the carriage 22 are preferably changed.

The movement at reciprocation of the carriage 22 is explained with reference to FIG. 4 which shows illustratively it and the variation in speed of the carriage 22 during conveyance is explained with reference to FIG. 5 which shows illustratively it. Further, as explained in FIGS. 3(a) to 3(f), in the case of making the position of the start sensor SS a start position, the case in that an image of the photographic film F is exposed under the magnification $m_0$ to the light-sensitive material P which is conveyed at a speed of $P_0$ at the constant speed (during exposure) by the exposure section conveying means 44 is explained according to the solid lines in FIGS. 4 and 5.

At first, the carriage 22 positions at the home position (FIG. 3(a)); from there, starts moving (in the left direction in FIG. 4) and stops at the reference position (FIG. 3(c)). After that, when the light-sensitive material P which is conveyed at a speed $P_0$ under the constant speed state (during exposure) by the exposure section conveying means 44 is detected by the light-sensitive material sensor SP, the carriage 22 starts moving in the scanning direction (right direction in FIG. 4) from the suspended state and reaches to a prescribed constant speed ($P_0/m_0$) up to the exposure start position (position where an image of the photographic film F arrives on the slit 15 in FIG. 3(d)); during the exposure, this state is maintained and the carriage 20 stops at the position of the home position (FIG. 3(e)).

In order to change a body in the suspended state to that in the constant speed, prescribed acceleration is performed and control is performed so as to maintain the state at the constant speed. However, some overshoot is generally caused. The region indicated by a ○ mark in FIG. 5 shows the overshoot. Further, the reference position where the start sensor SS of the present embodiment is provided represents a position apart from the slit 15 by a distance (including the overshoot distance) which is a necessary distance or a so-called approach distance to reach a constant speed ($P_0/m_0$) when an image of the photographic film F is exposed under the reference magnification $m_0$ to the light-sensitive material P which is conveyed at a speed of $P_0$, that is, by a so-called approach distance.

Next, when a scanning exposure is performed under the magnification $m_1$ (shown by an alternate long and short dash line in FIGS. 4 and 5), as shown in FIG. 5, a speed at the constant speed state is taken which is different from that under the magnification $m_0$. On the other hand, when the scanning exposure is performed under the magnification $m_1$, the constant speed is different. Therefore, when acceleration (change in speed per unit time when starting the movement from a suspended state to a moving state) of the carriage 22 is made the same as the case of the magnification $m_0$, no synchronization can be brought into the photographic film F and the light-sensitive material P in the case of starting the carriage 22 from the reference position according to the detection of the light-sensitive material sensor SP. On account of this, in the present embodiment, a position apart from the reference position by $\Delta Y$ is taken as a start position (refer to FIG. 4.). This start position is apart from the position of the slit 15 by a distance (including the distance corresponding to the overshoot) necessary to reach the constant speed state when an image of the photographic film F is exposed under the reference magnification $m_1$ to the light-light-sensitive material P, that is, by a distance so-called approach.

Incidentally, this start position is an example of a position to start moving. The position to start moving is one from which the original starts moving in the direction in which the original advances during the scanning exposure.

Accordingly, when a scanning exposure is performed under the magnification $m_1$, the carriage 22 starts moving from the position of the home position, pass the reference position (start sensor SS) and stops at a position apart from the start sensor SS by the prescribed distance $\Delta Y$. And when the light-sensitive material P which starts from this position as a start position and is conveyed at a speed (above formula) in the constant speed state (at exposure) by the exposure section conveying means 44 is detected by the light-sensitive material sensor SP (in the present embodiment, the position of the light-sensitive material SP is fixed.), the carriage 22 starts moving in the scanning direction (in the right direction in FIG. 4) from the suspended state; reaches the constant speed state of the above formula up to the exposure start position (position where the photographic film F reaches on the slit 15); maintains this state during exposure and stops at the position of the home position.

As mentioned above, in the present embodiment, when an exposure is performed changing the magnification, the moving speed of the photographic film F (carriage 22) is changed and at the same time, the start position is changed in accordance with the moving speed. As a result, various magnifications can be corresponded; time from the start of the photographic film F (carriage 22) to the completion of the exposure can be shortened (namely, time required for the approach is shortened.) and cycle time for performing a plurality of exposures of the image of an original can be shortened. Particularly, in an exposure apparatus such as the present embodiment in which the photographic film F as an original is exposed to photographic paper as the light-sensitive materials P, the magnification should cover a broad range from size-for-size to ten times or more. On the other hand, when corresponded without changing the start position and acceleration (acceleration enabling the moving speed of the photographic film to reach the constant speed state), under the low magnification (the moving speed of the photographic film is fast.), for securing the necessary, under the high magnification, (the moving speed of the photographic film is slow.) approach, the time from the start from the start position to reach the slit position becomes longer and thus, the cycle time becomes longer and becomes inefficient. Furthermore, when corresponded to this by changing the acceleration without changing the start position, as mentioned above, it is difficult to cover a wide range of magnification. For these, as shown in the present embodiment, by changing the start position according to the moving speed of the photographic film F, the time from the start of the photographic film F to the start of exposure can be shortened and the cycle time at a plurality of exposures of the image of an original can be shortened for the wide range of magnification.

Furthermore, in the present embodiment, by providing (or the reference position is provided at the position further nearer the slit 15 than the start position nearest the slit. In this case, the reference position shows a position which is simply termed a reference and does not become a start position for any moving speed (magnification)), at the side near the slit 15, the shortest distance from the home position of the carriage 22 to the start position can be arranged and the cycle time can be further shortened.

Furthermore, by providing (or the reference point is provided at a position more far from the slit than that of the start position most far from the slit. In this case, the reference position shows a position which is simply termed reference and does not become a start position for neither the moving speed nor magnification) the reference position among various start positions corresponding to the moving speed or magnification at the side far from the slit, the carriage 22, when it moves from the home position to the start position, moves once to a remote reference position and reversed to back direction and stops at the start position. Even in this case, the movement to the start position can be performed faster than the speed at exposure. Thus, the cycle time can be shortened and at the same time, error factors such as backlash of various driving systems can be minimized to improve the accuracy.

Particularly, as shown in the present embodiment, in the scanning exposure in which the photographic film F as an original is subjected to reciprocation and which is brought into synchronization with the light-sensitive material conveyed in one direction, the time necessary for the reciprocation of the photographic film F becomes a rate determining. However, the effect according to the above-mentioned structure is large.

Further, in the above-mentioned explanation, the explanation is made with reference to two of $m_0$ and $m_1$ as the magnification. However, the start position may be changed in accordance with various magnifications of two or more. Furthermore, in the present embodiment, it is explained that the start position is changed according to the magnification. However, change may be performed according to at least the moving speed (constant speed state) of the carriage 22 at the time of scanning exposure. Furthermore, as explained above, the moving speed (moving speed at the constant speed state) is changed according to the change in magnification. However, the start position is preferably changed according to the image density (density of an original). Furthermore, the change in the start position may be performed by changing the position of the start sensor SS or fixing the start sensor, the start position may be set which is apart from it by a prescribed distance. Furthermore, according to the change in the relative speed, the position x of the light-sensitive material sensor SP for bringing the photographic film F into synchronization with the light-sensitive material P is changed as mentioned hereinafter.

Position of photosensitive sensor $SP: x = \frac{m_1}{m_0} X_0$ (Formula 2)

Further, according to a principle, a ratio of the moving speed of the photographic film F to the moving speed of the carriage 22 may be changed. For that, the speed of one of them is fixed and the speed of the other may be changed. However, as is seen in the present embodiment, when photographic paper is employed as the light-sensitive material P, the speed is not decided only by the magnification. Because an exposure amount (illuminance) is involved, when changing the magnification, the moving speeds of both of the light-sensitive material P and the carriage 22 are preferably changed.

As is clearly seen in the above formula, when the position x of the light-sensitive material sensor SP increases according to the increase in the magnification (decrease in the conveying speed of the light-sensitive material P), it becomes possible to bring the photographic film F into synchronization with the light-sensitive material P and a scanning exposure apparatus is made which can correspond to various magnifications.

Further, the above explanation shows that the position x of the light-sensitive material sensor is changed according to various magnifications. However, at least, the position x of the light-sensitive material sensor SP may be changed according to the conveying speed of the light-sensitive material P by the exposure section conveying 44. Furthermore, the above explanation shows that the conveying speed of the light-sensitive material P and the moving speed of the photographic film are changed according to the change in the magnification. However, because each speed changes according to the image density (density of an original) of the photographic film F, the position of the light-sensitive material SP is preferably changed according to the image density.

Furthermore, in the embodiment explained above, the position x of the light-sensitive material sensor SP is changed to the position necessary to come into the synchronization so that the light-sensitive material is conveyed at the prescribed speed, an image of the photographic film F is exposed to the light-sensitive material P and soon after the light-sensitive material is detected by the light-sensitive material sensor SP, the carriage 22 starts moving. The above construction makes it possible to come readily into the synchronization. However, the following construction may be employed. The light-sensitive material sensor SP is fixed at the position x where the synchronization is brought when the magnification is largest and after the light-sensitive material sensor SP detected the light-sensitive material P, the movement of the carriage 22 is commenced by the scanning/moving means 25 after the prescribed elapse of time according to the moving speed (the conveying speed changes according to the magnification and the density of an original) of the light-sensitive material P by the exposure section conveying means 44.

The start of this prescribed time is a position to start moving. Or, it is also possible to employ constitution wherein position X of the light-sensitive material sensor SP is not changed, and the carriage 22 starts moving immediately after the detection conducted by the light-sensitive material sensor SP.

Further, in this case, after the light-sensitive material sensor SP detects the light-sensitive material P, the carriage 22 starts moving after an prescribed elapse of time. However, being not limited to this, when the light-sensitive material P in a standby state is subjected to conveyance by the exposure section conveying means 44, or after the signal for that is issued, the movement of the carriage 22 may be started after the prescribed elapse of time according to the conveying speed of the light-sensitive material P. In short, after the light-sensitive material P passes the prescribed position, the movement of the carriage may be started after the prescribed elapse of time according to the conveying speed in the constant speed state by the exposure section conveying means 44.

Next, with reference to FIGS. 6(a) to 6(f), the operation of the feeder 21 and the carriage base body 331 is explained in a pre-judgment mode in which correction values equivalent to one order are input in advance and scanning exposure for the order is continually performed. Further, in the case of the same as the above-mentioned single mode, explanation may be abbreviated.

Figure 6:
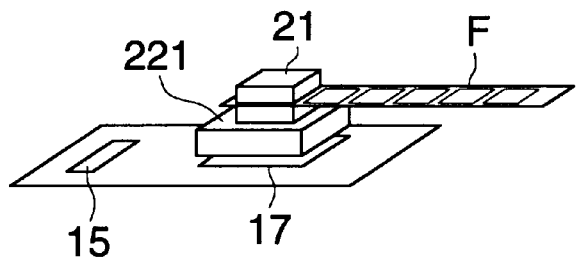
Figure 6:
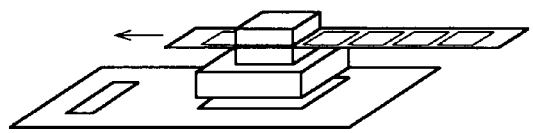
Figure 6:
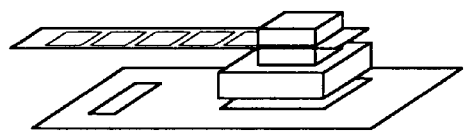
Figure 6:
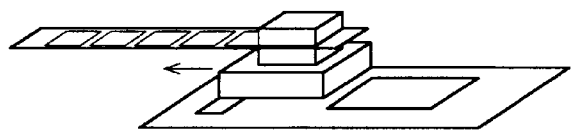
Figure 6:
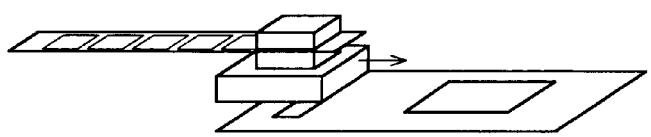
Figure 6:
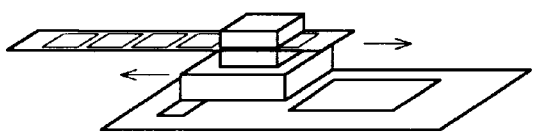

At first, in the same way as the above-mentioned single mode, the first frame of the photographic film F is set in the feeder 21 and the carriage base body 221 stops while the opening 212 of the feeder 21 positions over the viewer 17 (FIG. 6(a)). At this state, an operator confirms the image of the first frame. And performing positioning, the operator judges using transmitted image and inputs a correction value when desired.

When the judgment or input of the first frame is finished, the feeder 21 releases the pressure contact of the photographic film F by the pressure contact plate 211 and further, advancing the film by one frame by driving a pair of rollers 213 so that the second frame of the photographic film F positions at the opening 212 (FIG. 6(b)). And the operator performs position adjustment, judgment and input of correction values. The frame conveyance, position adjustment, judgment and input of correction values when desired are repeated to finish one order for the photographic film F (FIG. 6(c)). Further, input correction values and information on the position adjustment are stored in the storing means.

When positioning, judgment and input of correction values when desired of all the photographic film F for one order are finished, the feeder 21 moves the carriage base body 221 in the left direction in the figure up to the home position which is a position to start the movement for a scanning exposure while the sixth frame of the photographic film F is held at the opening 212 (FIG. 6(d)). During this movement, a light amount of light flux transmitting the image of the sixth frame is measured by the photometric element 342. Furthermore, when the photometry is finished, according to the correction value for the sixth frame stored in the storage means and the photometric value measured, the light controlling means is controlled and a amount of light is adjusted.

When the carriage base body 221 moves up to the home position, in order to scan the image of the sixth frame of the photographic film F, the carriage 21 is moved in the right direction in the figure while coming into synchronization with the light-sensitive material P and the scanning exposure is performed to the light-sensitive material P (FIG. 6(e)).

When the scanning of the image of the sixth frame of the photographic film F is finished, the feeder 21 releases the pressure contact of the photographic film F by the pressure contact plate 211 and further, advances a frame by driving a pair of rollers 213 so that the fifth frame of the photographic film F positions at the opening 212 (FIG. 6(f)).

When this advancing the frame is finished, the feeder 21 moves the carriage base body 221 in the left direction in the figure up to the home position which is a position to start the movement for a scanning exposure while the fifth frame of the photographic film F is held at the opening 212 and during the movement, the fifth frame is photometrically measured. When the photometry is finished, according to the correction value for the fifth frame stored in the storage means and photometric value measured, the light control means 13 is controlled and adjustment of the light amount is performed (refer to FIG. 6(d)).

And in the same way as FIG. 6(e), the image of the fifth frame of the photographic film F is scanned. In this manner, FIGS. 6(d) to (e) are repeated and scanning is performed for one order of the photographic film F. In this manner, at the pre-judge mode, the correction values for one order of the photographic film F are input in advance scanning exposure is continuously performed for the order.

Next, with reference to FIGS. 7(a) to 7(c), the operation of the feeder 21 and the carriage base body 221 at the a plurality of scanning modes in which the same frame is subjected to a plurality of scanning exposures of the numbers of specified prints or scanning is performed to form a plurality of same images on a single sheet of the light-sensitive material P (up image). Further, this mode can be performed either in the single mode or the pre-judge mode, both described above. In the following, is explained a case in which the first frame is subjected to a plurality of scanning.

The first scanning is performed for the first frame (FIG. 7(a)). When the first scanning for the first frame is finished, the feeder 21 moves the carriage base body 221 in the left direction in the figure up to the home position which is a position to start the movement for scanning exposure, while holding the first frame of the photographic film F at the opening 212. At the time, photometry and adjustment of the light amount according to the photometry may be performed, However, in the present embodiment, no photometry is performed by the photometric element 342, but the light-controlling means is controlled according to the photometric data obtained prior to the first scanning. Or the adjustment of light amount is not changed by the light-controlling means 13 (FIG. 7(b)).

When the carriage base body 221 moves up to the home position, for performing the second scanning of the first frame of the photographic film F, the carriage base body 221 is moved in the right direction in the figure while coming into the synchronization with the light-sensitive material P and a scanning exposure is performed to the light-sensitive material P (FIG. 7(c)).

The FIGS. 7(a) to 7(c) are repeated and the scanning exposures of the prescribed number of sheets are performed. In this way, the same frame is subjected to exposures of the prescribed number of the sheets.

Figure 7:
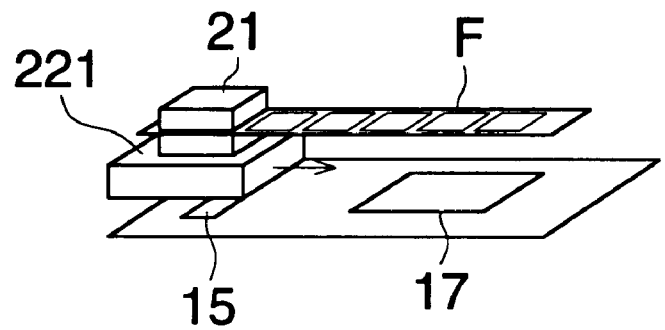
Figure 7:
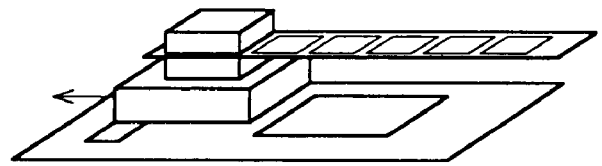
Figure 7:
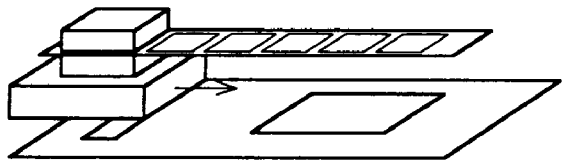

Further, in the case of performing a scanning exposure to form a plurality of same images on a sheet of the light-sensitive material P, when the first scanning is finished, the conveyance of the light-sensitive material P is stopped (or lower speed than the conveying speed at the exposure) and when the carriage base body 221 is moved to the home position (FIG. 7(b)), the shutter is closed (or the light source 11 is turned off) so that the light transmitting through the photographic film F is not projected to the suspended light-sensitive material P, and when the scanning is performed again (FIG. 7 (c)), the shutter 16 is opened.

Incidentally, embodiments of the invention are not limited to those described in this specification, and they may also include an embodiment wherein the position for the original to start moving is changed, while the position of a means to detect light-sensitive materials and the time to start moving the original are not changed, an embodiment wherein the position of a means to detect photographic light-sensitive materials is changed and the position for the original to start moving is not changed, or an embodiment wherein the time for the original to start moving is changed and the position for the original to start moving is not changed.

As described in detail above, according to the present invention, in the image forming apparatus in which an image recorded in a photographic film is subjected to scanning exposure to a light-sensitive material, when the image of an original is exposed to the light-sensitive material, it is possible to correspond to various magnifications and furthermore, when the image of the original is subjected to a plurality of exposures, the cycle time is shortened.

What is claimed is:

1. An exposure apparatus in which a photographic light-sensitive material is exposed to a light image of an original, comprising:
  (a) a light illuminating means for illuminating a light to the original;
  (b) an optical means for projecting a light transmitted through or reflected on the illuminated original onto an exposure position as a line image of the original;
  (c) a conveying means for conveying the material along a moving direction at a constant speed while the line image of the original is projected onto the material;
  (d) an original moving means for moving the original at a predetermined speed synchronized with said constant speed while the line image of the original is projected onto the material; and
  (e) a speed determining means for determining said predetermined speed according to magnification of the projected image of the original or image density of the original;

wherein a start position at which the original begins to move is varied according to said predetermined speed.

2. The exposure apparatus of claim 1 further comprising:
  a conveying speed determining means for determining a conveying speed of the material when the material is exposed to the line image, according to the magnification of the projected image of the original or the image density of the original; and
  a material detecting means provided upstream of the exposure position in a conveying direction of the material for detecting the material,
  wherein the original starts moving in concurrence with a time when the material detecting means detects the material, and
  the conveying means conveys the material at the determined conveying speed while the line image of the original is projected onto the material.

3. The exposure apparatus of claim 1 further comprising:
  a material detecting means provided upstream of the exposure position in a conveying direction of the material for detecting the material; and
  a start time determining means for determining a predetermined period of time between a time when the material is detected by the material detecting means and a time when the original starts moving, according to the magnification of the projected image of the original or the image density of the original,
  wherein the original starts moving from the start position after the predetermined period of time elapses and the material detecting means detects the material.

4. The exposure apparatus of claim 1 further comprising:

a material detecting means provided upstream of the exposure position in a conveying direction of the material for detecting the material, wherein a position of the material detecting means can be varied in the conveying direction of the material;

a detecting position determining means for determining the position of the material detecting means, according to the magnification of the projected image of the original or the image density of the original; and a means for moving the material detecting means to a position determined by the detecting position determining means, wherein the original starts moving in concurrence with a time when the material detecting means detects the material.

5. The exposure apparatus of claim 1, wherein the original moving means accelerates a moving speed of the original at the same acceleration even when the magnification of the projected image of the original or the image density of the original is varied.

6. The exposure apparatus of claim 1 further comprising:

a photometry means for measuring the image density of the original;

wherein the original moving means reciprocates the original along said moving direction, the photometric means measures the image density of the original during a forward stroke of the original, and the material is exposed to the line image of the original during a backward stroke of the original.

7. The exposure apparatus of claim 1, wherein the original is a photographic film including a plurality of frames, the original moving means includes a film holding means for holding the frames to be illuminated, a frame feeding means for changing the frames to be illuminated by releasing holding of the film holding means and feeding the film, and when a frame of the film is illuminated, the original moving means moves the photographic film while the film holding means holds the frame to be illuminated.

8. The exposure apparatus of claim 1, wherein the optical means has a plurality of focusing means, and a switching means for selectively switching wherein the of focusing means, and wherein the line image is focused onto the material by a selected focusing means.

9. The exposure apparatus of claim 8, wherein one of the plurality of focusing means includes a plurality of lenses having substantially the same focal length to project a plurality of images onto the material in a direction perpendicular to said moving direction of the original.

10. The exposure apparatus of claim 1 further comprising:

a material detecting means provided upstream of the exposure position in a conveying direction of the material for detecting the material, wherein the original starts moving after the material detecting means detects the material.

11. The exposure apparatus of claim 1 wherein said start position is a distance upstream along said moving direction from a slit for exposing said material to said line image of said original, said distance being at least sufficient to allow said original to attain said predetermined speed.

12. The exposure apparatus of claim 1 wherein said original is an actual image smaller in area than a frame of a photographic film on which said actual image is formed, said actual image being projected onto said material.

13. The exposure apparatus of claim 12, wherein the original is a photographic film, the edge of the image of the original is a leading edge or trailing edge of each of the frames of the photographic film in said moving direction.

14. An exposure apparatus comprising (a) a light illuminating means for illuminating a light to the original;

(b) an optical means for projecting a light transmitted through or reflected on the illuminated original onto an exposure position as a line image of the original;

(c) a conveying means for conveying the material at a first predetermined speed while the line image of the original is projected onto the material;

(d) an original moving means for moving the original first predetermined speed synchronized with said first predetermined speed while the line image of the original is projected onto the material;

(e) a material detecting means provided upstream of the exposure position in a conveying direction of the material for detecting the material; and (f) a start time determining means for determining a period of time representing a moving start time between a time when the material is detected by the material detecting means and a time when the original starts moving, according to the magnification of the projected image of the original or the image density of the original, wherein the original starts moving from the start position after the moving start time determined by the start time determining means elapses and the material detecting means detects the material.

15. The exposure apparatus of claim 14 wherein the start position of the original moving means is variable, the apparatus further comprising:

a start position determining means for determining a start position of the original moving means at which the original moving means starts moving according to the magnification of the projected image of the original or image density of the original, wherein the original moving means starts moving the original from the start position, thereby the second predetermined speed of the original while the line image of the original is projected onto the material, is varied.

16. The exposure apparatus of claim 14, wherein an acceleration of the original moving means is variable, the apparatus further comprising:

an acceleration determining means for determining the acceleration according to magnification of the projected image of the original or image density of the original, wherein the original moving means is accelerated at an acceleration determined by the acceleration determining means.

17. The exposure apparatus of claim 14 further comprising:

a conveying speed determining means for determining a conveying speed of the material when the material is exposed to the line image, according to the magnification of the projected image of the original or the image density of the original, wherein the conveying means conveys the material at a conveying speed determined by the conveying speed determining means.

18. The exposure apparatus of claim 14, wherein the original is a photographic film including a plurality of frames, the original moving means includes a film holding means for holding the frames to be illuminated, a frame feeding means for changing the frames to be illuminated by releasing holding of the film holding means and feeding the film, and when a frame of the film is illuminated, the original moving means moves the photographic film while the film holding means holds the frame to be illuminated.

19. The exposure apparatus of claim 14, wherein the optical means has a plurality of focusing means, and a switching means for selectively switching the plurality of focusing means, and wherein the line image is focused onto the material by a selected focusing means.

20. The exposure apparatus of claim 19, wherein one of the plurality of focusing means includes a plurality of lenses having substantially the same focal length to project a plurality of images onto the material in a direction perpendicular to said moving direction of the original.

21. The exposure apparatus of claim 14 wherein said original is an actual image smaller in area than a frame of a photographic film on which said actual image is formed, said actual image being projected onto said material.

22. The exposure apparatus of claim 21, wherein the original is a photographic film, the edge of the image of the original is a leading edge or trailing edge of each of the frames of the photographic film in a moving direction.

23. An exposure apparatus in which a photographic light-sensitive material is exposed to a light image of an original, comprising:

(a) a light illuminating means for illuminating a light to the original;

(b) an optical means for projecting a light transmitted through or reflected on the illuminated original onto an exposure position as a line image of the original;

(c) a conveying means for conveying the material at a first predetermined speed while the line image of the original is projected onto the material;

(d) an original moving means for moving the original at a first predetermined speed synchronized with said constant speed while the line image of the original is projected onto the material;

(e) a material detecting means provided upstream of the exposure position in a conveying direction of the material for detecting the material, wherein a position of the material detecting means can be varied in the conveying direction of the material;

(f) a position determining means for determining the position of the material detecting means, according to the magnification of the projected image of the original or the image density of the original; and (g) a material detecting means moving for moving the material detecting means to a position determined by the position determining means, wherein the original starts moving in concurrence with a time when the material detecting means detects the material, or after the material detecting means detects the material.

24. The exposure apparatus of claim 23, wherein a start position of said original moving means is variable, the apparatus further comprising:

a start position determining means for determining a start position at which the original starts to move according to magnification of the projected image of the original or image density of the original, wherein the start position is changed to a position determined by the start position determining means, thereby the second predetermined speed of the original while the line image of the original is projected onto the material, is varied.

25. The exposure apparatus of claim 23, wherein an acceleration of the moving means is variable, the apparatus further comprising:

an acceleration determining means for determining the acceleration according to magnification of the projected image of the original or image density of the original, wherein the original moving means is accelerated at an acceleration determined by the acceleration determining means.

26. The exposure apparatus of claim 23 further comprising:

a conveying speed determining means for determining a conveying speed of the material when the material is exposed to the line image, according to the magnification of the projected image of the original or the image density of the original, wherein the conveying means conveys the material at a conveying speed determined by the conveying speed determining means.

27. The exposure apparatus of claim 23 wherein said original is an actual image smaller in area than a frame of a photographic film on which said actual image is formed, said actual image being projected onto said material.

28. The exposure apparatus of claim 27, wherein the original is said photographic film, the edge of the image of the original is a leading edge or trailing edge of each of the frames of the photographic film in a moving direction.

29. The exposure apparatus of claim 23, wherein the original is a photographic film including a plurality of frames, the original moving means includes a film holding means for holding the frames to be illuminated, a frame feeding means for changing the frames to be illuminated by releasing holding of the film holding means and feeding the film, and when a frame of the film is illuminated, the original moving means moves the photographic film while the film holding means holds the frame to be illuminated.

30. The exposure apparatus of claim 23, wherein the optical means has a plurality of focusing means, and a switching means for selectively switching the plurality of focusing means, and wherein the line image is focused onto the material by a selected focusing means.

31. The exposure apparatus of claim 30, wherein one of the plurality of focusing means includes a plurality of lenses having substantially the same focal length to project a plurality of images onto the material in a direction perpendicular to said moving direction of the original.

* * * * *